United States Patent
Yamaguchi et al.

(10) Patent No.: US 8,604,124 B2
(45) Date of Patent: Dec. 10, 2013

(54) RUBBER-BASED PRESSURE-SENSITIVE ADHESIVE COMPOSITION AND PRESSURE-SENSITIVE ADHESIVE SHEET OF THE SAME

(75) Inventors: Tomoo Yamaguchi, Ibaraki (JP); Yasunobu Ina, Ibaraki (JP)

(73) Assignee: Nitto Denko Corporation, Osaka (JP)

( * ) Notice: Subject to any disclaimer, the term of this patent is extended or adjusted under 35 U.S.C. 154(b) by 801 days.

(21) Appl. No.: 10/870,733

(22) Filed: Jun. 18, 2004

(65) Prior Publication Data

US 2004/0260007 A1 Dec. 23, 2004

(30) Foreign Application Priority Data

Jun. 19, 2003 (JP) .............. P. 2003-174255

(51) Int. Cl.
C08C 19/08 (2006.01)
C08F 8/50 (2006.01)

(52) U.S. Cl.
USPC ............ 524/575.5; 526/931; 528/931

(58) Field of Classification Search
USPC ............ 524/575.5; 526/931; 528/931
See application file for complete search history.

(56) References Cited

U.S. PATENT DOCUMENTS

| | | | | |
|---|---|---|---|---|
| 2,658,044 | A * | 11/1953 | Anderson ............ | 524/394 |
| 5,576,372 | A * | 11/1996 | Kresge et al. ......... | 524/442 |
| 6,410,606 | B2 * | 6/2002 | Banba et al. .......... | 521/41 |
| 6,518,355 | B1 | 2/2003 | Shibata et al. | |
| 2001/0034384 | A1 * | 10/2001 | Banba et al. ......... | 524/86 |
| 2004/0241434 | A1 | 12/2004 | Yamaguchi et al. | |
| 2004/0258936 | A1 | 12/2004 | Yamaguchi et al. | |

FOREIGN PATENT DOCUMENTS

| | | | | |
|---|---|---|---|---|
| JP | 54096539 | A | * | 7/1979 |
| JP | 59136246 | A | * | 8/1984 |
| JP | 02006578 | A | * | 1/1990 |
| JP | 02296883 | A | * | 12/1990 |
| JP | 05194916 | A | * | 8/1993 |
| JP | 5-263052 | A | | 10/1993 |
| JP | 7-268298 | A | | 10/1995 |
| JP | 09-249716 | A | | 9/1997 |
| JP | 09249716 | A | * | 9/1997 |
| JP | 2000-080338 | A | | 3/2000 |
| JP | 2000-109771 | A | | 4/2000 |
| JP | 2001055548 | A | * | 2/2001 |
| JP | 2001-181596 | A | | 7/2001 |
| JP | 2001181596 | A | * | 7/2001 |
| JP | 2001-294824 | A | | 10/2001 |
| JP | 2003-041233 | A | | 2/2003 |
| JP | 2003-213231 | A | | 7/2003 |
| WO | WO 9967338 | A1 | * | 12/1999 |

OTHER PUBLICATIONS

Translation to Shirai et al. (JP 02296883) Dec. 1990.*
Translation to Tanaka et al. (JP 09-249716) Sep. 1997.*

* cited by examiner

*Primary Examiner* — Kelechi Egwim
(74) *Attorney, Agent, or Firm* — Sughrue Mion, PLLC

(57) ABSTRACT

A rubber-based pressure-sensitive adhesive composition comprising a rubbery polymer, and a natural rubber having a weight-average molecular weight of from 100,000 to 400,000, wherein the amount of the natural rubber is 5 parts by weight or more and less than 100 parts by weight, based on 100 parts by weight of the rubbery polymer.

9 Claims, No Drawings

RUBBER-BASED PRESSURE-SENSITIVE ADHESIVE COMPOSITION AND PRESSURE-SENSITIVE ADHESIVE SHEET OF THE SAME

FIELD OF THE INVENTION

The present invention relates to a rubber-based pressure-sensitive adhesive composition and a pressure-sensitive adhesive sheet comprising a substrate and the composition applied thereon.

BACKGROUND ART

Rubber-based pressure-sensitive adhesive compositions generally have no adherend selectivity and can show stable adhesive strength in application to all kinds of adherend surfaces. Even in application to rough surfaces having irregularities, satisfactory adhesive strength is obtained by increasing the thickness of the adhesive layer because the increase in adhesive layer thickness enables the pressure-sensitive adhesive to conform to the surface irregularities and have an enlarged adhesion area.

Furthermore, solid type pressure-sensitive adhesive compositions can be handled as solventless nonaqueous pressure-sensitive adhesive compositions which contain neither any organic solvent causative of environmental pollution nor water, which necessitates much energy for drying.

Such rubber-based pressure-sensitive adhesive compositions have hitherto been prepared in the following manner. A rubbery polymer is used as a main ingredient, and a tackifier is mixed therewith. A filler, e.g., a fine calcium carbonate powder, and other ingredients including a softener such as an oil and an antioxidant are usually mixed therewith in appropriate amounts. This mixture is kneaded with a kneader, Banbury mixer, mixing rolls, or the like with heating to thereby obtain a pressure-sensitive adhesive composition which is solid at ordinary temperature.

This pressure-sensitive adhesive composition is applied usually with a calender or extruder to a substrate in a thickness of generally from 0.1 mm to about several millimeters to produce a pressure-sensitive adhesive sheet or tape suitable for adhesion to rough surfaces having irregularities.

Incidentally, a pressure-sensitive adhesive sheet is required to have adhesive strength which is the ability to conform to adherends and tenaciously adhere thereto. The temperature dependence of this adhesive strength also is an important property. In particular, the tapes to be used outdoors in, e.g., building/civil engineering works are required to show stable adhesive strength regardless of whether they are used in the cold winter season or in the hot summer season.

A technique effective in securing low-temperature adhesiveness is to incorporate a softener such as an oil to prevent the pressure-sensitive adhesive from becoming rigid. Incorporation of a large amount of a softener enables the pressure-sensitive adhesive to be soft even at low temperatures and have improved adhesiveness to rough surfaces. However, since the softener itself does not have the property of imparting tackiness, there are limitations on adhesiveness improvement. In addition, the corporation of a softener disadvantageously makes the pressure-sensitive adhesive too soft at high temperatures and, hence, is apt to result in a decrease in cohesive force.

As described above, low-temperature adhesiveness and high-temperature cohesive force are inconsistent with each other, and it is not easy to balance these two properties with each other by the incorporation of a softener. Namely, compositions suitable for an improvement in high-temperature cohesive force show poor low-temperature adhesiveness to rough surfaces and unavoidably suffer an adhesion failure in which application at low temperatures in winter results in adhesive layer separation. This has been a reason for an obstacle to the use of pressure-sensitive adhesive tapes as a substitute for caulking.

On the other hand, compositions suitable for an improvement in low-temperature adhesiveness show poor cohesive force at high temperatures in summer and, hence, are also apt to suffer an adhesion failure. Moreover, these compositions are apt to have a problem concerning workability that the pressure-sensitive adhesive sticks to the hands of workers.

It is known that like ordinary rubber products, rubber-based pressure-sensitive adhesive compositions of the solid type can be made to have enhanced cohesive force and retain high-temperature cohesive force even when the amount of the softener incorporated therein is increased, by crosslinking the rubber with a crosslinking agent. A technique for evenly and moderately conducting the crosslinking treatment is also known which comprises adding a tackifier to a rubbery polymer and crosslinking the polymer with an isocyanate crosslinking agent to thereby enhance cohesive force while maintaining adhesive strength (see JP-A-2001-181596 (pages 2-4)).

SUMMARY OF THE INVENTION

As described above, solid type rubber-based pressure-sensitive adhesive compositions contribute to environmental hygiene, energy saving, etc. because they are solventless and nonaqueous compositions, and are especially suitable for adhesion to rough surfaces. In addition, various measures have been taken, such as the enhancement of high-temperature cohesive force by a crosslinking treatment.

However, in order for a pressure-sensitive adhesive sheet produced from such a pressure-sensitive adhesive composition to be usable in taping application to rough-surface adherends which have considerable surface irregularities and are presently treated by, e.g., caulking, the pressure-sensitive adhesive sheet should have further enhanced adhesive strength.

Under these circumstances, an object of the invention is to provide a rubber-based pressure-sensitive adhesive composition which has enhanced low-temperature adhesive strength in application to rough surfaces and retains high-temperature cohesive force and which is hence excellent in both of low-temperature adhesive strength in application to rough surfaces and high-temperature adhesive strength.

The present inventors made intensive investigations in order to accomplish the object. As a result, it has been found that when natural rubber having a weight-average molecular weight of from 100,000 to 400,000 is incorporated into a main ingredient comprising a rubbery polymer, then adhesiveness is greatly improved because the natural rubber functions as a softener for the main-ingredient polymer and further has the tackiness inherent in natural rubber, whereby the composition satisfactorily adheres at low temperatures to exhibit pressure-sensitive adhesive properties having a small temperature dependence.

Unlike ordinary softeners having a molecular weight on the order of from hundreds to thousands, the natural rubber having a weight-average molecular weight of from 100,000 to 400,000 was found to be less apt to reduce high-temperature cohesive force because it has such relatively high molecular weight. The natural rubber was hence found to be effective in improving the low-temperature adhesiveness to rough surfaces while maintaining cohesive force.

Furthermore, the following has been found. The resultant pressure-sensitive adhesive composition not only thus satisfies both of the two properties, i.e., low-temperature adhesive strength in application to rough surfaces and high-temperature holding power, but also has excellent durability with reduced changes in adhesive properties in long-term standing at a high temperature. The pressure-sensitive adhesive sheet produced from this composition can be applied even to rough-surface adherends which have considerable surface irregularities and have been treated by caulking, and thus enables such adherends to be sufficiently treated by taping.

The invention has been completed based on these findings. As a result, the present has the following constitution.

(1) A rubber-based pressure-sensitive adhesive composition comprising:
a rubbery polymer, and
a natural rubber having a weight-average molecular weight of from 100,000 to 400,000,
wherein the amount of the natural rubber is 5 parts by weight or more and less than 100 parts by weight, based on 100 parts by weight of the rubbery polymer.

(2) The rubber-based pressure-sensitive adhesive composition according to the above (1), wherein the amount of the natural rubber is from 5 to 50 parts by weight based on 100 parts by weight of the rubbery polymer.

(3) The rubber-based pressure-sensitive adhesive composition according to the above (1), wherein the rubbery polymer comprises at least one nonpolar rubber selected from the group consisting of a natural rubber, a butyl rubber, a reclaimed butyl rubber, an isoprene rubber, a polyisobutylene, an ethylene/propylene rubber, a silicone rubber, a styrene/butadiene block copolymer, and a styrene/isoprene block copolymer.

(4) The rubber-based pressure-sensitive adhesive composition according to the above (1), which is solid.

(5) The rubber-based pressure-sensitive adhesive composition according to the above (1), which further comprises a tackifier in an amount of from 10 to 200 parts by weight based on 100 parts by weight of the rubbery polymer.

(6) The rubber-based pressure-sensitive adhesive composition according to the above (1), which further comprises a softener in an amount of 200 parts by weight or smaller based on 100 parts by weight of the rubbery polymer.

(7) The rubber-based pressure-sensitive adhesive composition according to the above (1), which further comprises a crosslinking agent in an amount of from 0.1 to 20 parts by weight based on 100 parts by weight of the rubbery polymer.

(8) A pressure-sensitive adhesive sheet which comprises a substrate having provided thereon a layer comprising the rubber-based pressure-sensitive adhesive composition according to any one of the above (1) to (7).

In the invention, the term "nonpolar rubber" means a rubber which does not include a polar functional group (e.g. —Cl, —Br, —COOH, —OH, —CN).

The term "solid" herein means that the composition is a solventless and nonaqueous one, i.e., the composition does not contain any medium such as an organic solvent or water.

In this specification, the term "pressure-sensitive adhesive sheet" implies any of pressure-sensitive adhesive sheets generally having a large width and pressure-sensitive adhesive tapes generally having a small width, or any of pressure-sensitive adhesive products in various forms including pressure-sensitive adhesive labels.

DETAILED DESCRIPTION OF THE INVENTION

The rubbery polymer to be used as a main ingredient in the invention may be any rubbery polymer which has satisfactory compatibility with natural rubber having a weight-average molecular weight of from 100,000 to 400,000.

For example, nonpolar rubbers are used, such as a natural rubber, a butyl rubber, a reclaimed butyl rubber, an isoprene rubber, a polyisobutylene, an ethylene/propylene rubber, a styrene/butadiene block copolymer, and a styrene/isoprene block copolymer. Preferred of these from the standpoint of adhesiveness are a natural rubber, a butyl rubber, a reclaimed butyl rubber, a styrene/butadiene block copolymer, and a styrene/isoprene block copolymer. One of those nonpolar rubbers may be used alone, or a blend of two or more thereof may be used.

The natural rubber to be added as a softener in the invention is natural rubber having a weight-average molecular weight of from 100,000 to 400,000, preferably from 120,000 to 300,000, more preferably from 150,000 to 250,000. Such natural rubber can be produced, for example, from ordinary natural rubber as a starting material by applying a mastication technique for physical molecular cleavage, a peptization technique for chemical molecular cleavage, or the like to the starting material.

In the invention, this natural rubber is incorporated in an amount of 5 parts by weight or more and less than 100 parts by weight, especially preferably from 5 to 50 parts by weight, more preferably from 5 to 40 parts by weight, based on 100 parts by weight of the rubbery polymer. As a result, low-temperature adhesive strength in application to rough surfaces can be greatly improved while maintaining high-temperature cohesive force. Favorable results can be obtained also in the improvement of durability.

In contrast, in case where the weight-average molecular weight of the natural rubber is lower than 100,000 or where the proportion of the natural rubber to the main-ingredient polymer is 100 parts by weight or larger, it is difficult to maintain high-temperature cohesive force.

On the other hand, when the weight-average molecular weight of the natural rubber exceeds 400,000 or when the proportion of the natural rubber to the main-ingredient polymer is less than 5 parts by weight, then low-temperature adhesive strength in application to rough surfaces is not sufficiently improved and the effect of improving durability is not obtained.

The applicant proposed in JP-A-2000-80338 to use as a rubber-based pressure-sensitive adhesive a specific natural rubber comprising, as the main component, fine particles having a particle diameter of 1 μm or smaller contained in a raw natural rubber latex to thereby obtain adhesive properties simultaneously with satisfactory productivity. There is a description therein to the effect that the weight-average molecular weight of that natural rubber is in the range of from 100,000 to 1,000,000. This range overlaps the range of the weight-average molecular weight of the natural rubber according to the invention.

However, in this proposal, that natural rubber is used as the main-ingredient polymer and, because of this, there is a description therein to the effect that the especially preferred range of the weight-average molecular weight thereof is from 500,000 to 800,000. Ones having a weight-average molecular weight of from 700,000 to 800,000 are shown in the Examples 1 and 2 therein, and one having a weight-average molecular weight of 480,000 is shown in the Example 3 therein. In addition, the proposal uses that natural rubber in the form of a latex or an organic solvent solution.

To sum up, that proposal neither discloses nor teaches a technical idea that natural rubber having a specific weight-average molecular weight is incorporated as a softening agent in a specific proportion into a main ingredient comprising a rubbery polymer to thereby improve low-temperature adhesive strength in application to rough surfaces which maintaining high-temperature holding power and further improve durability, with respect to a rubber-based pressure-sensitive adhesive composition such as that of the invention, especially of the solid type.

The applicant further proposed in JP-A-9-249716 to use, as a plasticizer for incorporation into a rubber base, a depolymerized natural rubber obtained by depolymerizing a deproteinized natural rubber to thereby obtain a rubber product which has a smaller hysteresis loss and better impact resilience than in the case of using the ordinary depolymerized natural rubber which has not been deproteinized. There is a description therein to the effect that the number-average molecular weight of the depolymerized natural rubber is 150,000 or lower.

However, there is a description in that patent document to the effect that the preferred range of the number-average molecular weight of the depolymerized natural rubber is from 100,000 to 2,000, and ones respectively having number-average molecular weights of about 20,000 and about 5,000 are shown in Examples therein. These depolymerized natural rubbers have a considerably lower molecular weight than the natural rubber according to the invention which has a specific weight-average molecular weight. The technique proposed is intended to produce the effect described above by incorporating such a low-molecular natural rubber as a plasticizer in the form of a latex into a rubber base.

Consequently, the proposal described above also neither discloses nor teaches a technical idea that natural rubber having a specific weight-average molecular weight is incorporated into a main ingredient comprising a rubbery polymer to thereby obtain a rubber-based pressure-sensitive adhesive composition, such as that of the invention especially of the solid type, which is excellent in both high-temperature holding power and low-temperature adhesive strength in application to rough surfaces and further has excellent durability.

A tackifier is generally used in the invention besides the main ingredient described above and a natural rubber having a weight-average molecular weight of from 100,000 to 400,000. This tackifier is added not only for imparting tackiness but also for facilitating thermal softening.

As the tackifier may be used various resins compatible with the rubbery polymer, such as a petroleum resin, a phenolic resin, a rosin resin, and a terpene resin. Such tackifiers may be used in an amount of from 10 to 200 parts by weight, preferably from 20 to 150 parts by weight, based on 100 parts by weight of the rubbery polymer.

A general softener may be incorporated in the invention according to need. This softener is added for the purpose of obtaining the effect of softening at low temperatures and the effect of imparting low-temperature adhesiveness, although the latter effect is lower than that produced with the natural rubber.

Examples thereof include a polybutene, a process oil, and a liquid tackifier. Such softeners may be used in an amount of 200 parts by weight or smaller, preferably from 5 to 150 parts by weight, based on 100 parts by weight of the rubbery polymer.

Various compounding agents can be further incorporated as other optional ingredients in the invention. Examples of the compounding agents include fillers such as calcium carbonate, talc, and magnesium oxide, antioxidants, plasticizers, and crosslinking agents. The amounts of such ingredients to be used per 100 parts by weight of the rubbery polymer are as follows.

The amount of a filler may be 300 parts by weight or smaller, preferably from 50 to 250 parts by weight. The amount of an antioxidant may be 5 parts by weight or smaller, preferably from 0.5 to 5 parts by weight, more preferably from 1 to 3 parts by weight.

In the invention, a natural rubber having a weight-average molecular weight of from 100,000 to 400,000 and an ordinary tackifier are mixed with a main ingredient comprising the rubbery polymer described above, and the various optional ingredients shown above are added thereto. The resultant mixture is usually kneaded with heating to obtain a rubber-based pressure-sensitive adhesive composition of the solid type. This method is friendly to the global environment and desirable from the standpoint of energy saving because the method uses neither any organic solvent causative of environmental pollution nor water, which necessitates much energy for drying.

A crosslinking agent may be added in the kneading in the invention according to need. The crosslinking agent may be used in an amount of from 0.1 to 20 parts by weight, preferably from 0.5 to 10 parts by weight, based on 100 parts by weight of the rubbery polymer.

The crosslinking agent may be a thiuram vulcanizing agent, a quinoid vulcanizing agent, a quinonedioxime vulcanizing agent, or a maleimide vulcanizing agent. Specific examples thereof include a tetramethylthiuram disulfide (Nocceler TT), a dipentamethylenethiuram tetrasulfide (Nocceler TRA), a poly(p-dinitrosobenzene) (Vulnoc DNB), a p-quinonedioxime (Vulnoc GM), and a N,N'-m-phenylenedimaleimide (Vulnoc PM). Besides vulcanization with these, isocyanate vulcanization is possible in the case of natural rubber. Such crosslinking agents may be used alone or in combination of two or more thereof.

After the addition of a crosslinking agent, the resultant mixture is continuously kneaded with heating. As a result, the crosslinking agent is evenly dispersed in the mixture being kneaded and, simultaneously therewith, reacts evenly with the main ingredient comprising a rubbery polymer. Thus, a rubber-based pressure-sensitive adhesive composition having a structure in which the main-ingredient rubbery polymer has been moderately crosslinked can be obtained.

The kneading can be conducted with a kneading machine for batch processing, such as a pressure kneader, Banbury mixer, or mixing rolls, or a kneading machine for continuous processing, such as a twin-screw kneader. For the kneading, a suitable kneading temperature in the range of about from 100 to 200° C. is selected according to the kinds of the rubber and other ingredients. The period of kneading is suitably determined according to the kneading temperature while examining the kneading torque so that the total kneading period for each ingredient is in the range of from 3 to 60 minutes. In the case where a crosslinking agent has been added, conditions under which the crosslinks formed by reaction do not break are selected.

The rubber-based pressure-sensitive adhesive composition thus obtained has such satisfactory moldability that it readily softens upon heating. Because of this, the composition can be applied with heating to a substrate, e.g., a fabric, paper, or plastic film, by means of a calender roll, extruder, or the like, whereby a pressure-sensitive adhesive sheet in a sheet, tape, or another form can be produced which comprises the substrate and formed thereon a layer made of the pressure-sensitive adhesive composition.

As stated above, the production process described above uses neither any organic solvent causative of environmental pollution nor water, which necessitates much energy for drying. There is hence no need of conducting the step of heating with a drying oven after application to a substrate. Consequently, the process for producing the pressure-sensitive adhesive sheet is friendly to the global environment and greatly contributes to energy saving.

The pressure-sensitive adhesive sheet of the invention thus produced has excellent low-temperature adhesive strength in application to rough surfaces having considerable irregularities and further has excellent holding power. The holding power thereof less decreases when the adhesive sheet is allowed to stand at high temperatures. In addition, the adhesive sheet does not suffer adhesive protrusion at high temperatures in the summer season and is less apt to stick to the hands of workers. The adhesive sheet hence has excellent workability.

The thickness of the adhesive, i.e., the thickness of the layer made of the pressure-sensitive adhesive composition, can be regulated to a value in a wide range of generally from 0.1 to 2 mm. By regulating the adhesive thickness to a value within this range according to the surface roughness of the adherend, the adhesive sheet can be made free from an abrupt decrease in low-temperature adhesive strength in application to rough surfaces unlike the rubber-based pressure-sensitive adhesive sheets according to related-art techniques. Problems such as, e.g., adhesive layer separation can hence be avoided. Furthermore, problems such as adhesion failures at high temperatures and the sticking of an adhesive to the hands of workers can also be avoided.

Because of this, the pressure-sensitive adhesive sheet of the invention is useful as, e.g., a single- or double-faced pressure-sensitive adhesive tape for application to rough surfaces in the field of building/civil engineering works, etc., and can be used in taping as a substitute for caulking. Furthermore, the pressure—sensitive adhesive sheet of the invention can be extensively utilized in other various applications where adhesiveness to rough surfaces is desired.

EXAMPLES

The invention will be explained below in more detail by reference to Examples thereof. However, the invention should not be construed as being limited to the following Examples.

In the following, the weight-average molecular weights of the rubbery polymers used as main ingredients, a natural rubber having a weight-average molecular weight of from 100,000 to 400,000, and other ingredients were determined through measurement by gel permeation chromatography (GPC) and calculation for standard polystyrene.

In this operation, a 1 g/L tetrahydrofuran (THF) solution of a sample was prepared, allowed to stand overnight, and then filtered through a 0.45 μm membrane filter, and the resultant filtrate was subjected as a sample to the measurement.

The GPC apparatus and conditions are as follows.
<Apparatus>
"HLC-8120GPC" manufactured by TOSOH Corp.
<Conditions>
Column: TSKgelGMH-H(S)×2
(two columns connected; size, 7.8 mm×300 mm)
Eluent: THF
Flow rate: 0.5 mL/min
Detector: RI
Column temperature: 40° C.
Injection amount: 100 μL
Molecular weight: calculated for standard polystyrene Example 1

Into a 5 L pressure kneader heated at 150° C. was introduced 3,000 g of natural rubber SVR (weight-average molecular weight, 1,800,000). This rubber was masticated for 120 minutes to obtain natural rubber having a weight-average molecular weight of 200,000.

One thousand grams of a reclaimed butyl rubber [Mooney viscosity $ML_{1+4}$ (100° C.), 44±6] was introduced into a 5 L pressure kneader heated at 120° C. Thereto were added 300 g of the natural rubber having a weight-average molecular weight of 200,000 obtained by the mastication and 2,000 g of a calcium carbonate powder. These ingredients were kneaded together for about 5 minutes.

Five hundred grams of "Escorez 1202" manufactured by Exxon Co., a petroleum resin, was introduced as a tackifier into the kneader, and the contents were kneaded for about 10 minutes. Furthermore, 1,000 g of "Polybutene HV300" manufactured by Nippon Petrochemicals Co., Ltd. was added as a softener in several portions, and the contents were kneaded for about 10 minutes. Finally, 20 g of "Vulnoc DNB" manufactured by Ouchi-Shinko Chemical Industrial Co., Ltd., a quinoid crosslinking agent, was introduced as a crosslinking agent into the kneader, and the mixture was crosslinked for about 5 minutes with kneading and then taken out of the kneader. Thus, a rubber-based pressure-sensitive adhesive composition of the solid type was prepared.

Subsequently, this solid type rubber-based pressure-sensitive adhesive composition was applied with heating at 100° C. on a substrate (back-coated polypropylene film having a thickness of 60 μm) by means of a 10 inch four-roll calender in a thickness of 0.2 mm. The film coated was cut into a given width to produce a pressure-sensitive adhesive tape.

Example 2

A solid type rubber-based pressure-sensitive adhesive composition was prepared in the same manner as in Example 1, except that the amount of the natural rubber (weight-average molecular weight, 200,000) was changed from 300 g to 100 g. This composition was used to produce a pressure-sensitive adhesive tape in the same manner as in Example 1.

Comparative Example 1

A solid type rubber-based pressure-sensitive adhesive composition was prepared in the same manner as in Example 1, except that the natural rubber (weight-average molecular weight, 200,000) was not used at all. This composition was used to produce a pressure-sensitive adhesive tape in the same manner as in Example 1.

Comparative Example 2

A solid type rubber-based pressure-sensitive adhesive composition was prepared in the same manner as in Example 1, except that in place of 300 g of the natural rubber (weight-average molecular weight, 200,000), use was made of the same amount of masticated natural rubber having a weight-average molecular weight of 600,000. This composition was used to produce a pressure-sensitive adhesive tape in the same manner as in Example 1.

Comparative Example 3

A solid type rubber-based pressure-sensitive adhesive composition was prepared in the same manner as in Example 1, except that the amount of the natural rubber (weight-average molecular weight, 200,000) was changed from 300 g to 1,100 g. This composition was used to produce a pressure-sensitive adhesive tape in the same manner as in Example 1.

Comparative Example 4

A solid type rubber-based pressure-sensitive adhesive composition was prepared in the same manner as in Example 1, except that in place of 300 g of the natural rubber (weight-average molecular weight, 200,000), use was made of the same amount of a liquid polyisoprene rubber having a weight-average molecular weight of 50,000 ("LIR-50" manufactured by Kuraray Co., Ltd.) This composition was used to produce a pressure-sensitive adhesive tape in the same manner as in Example 1.

Comparative Example 5

A solid type rubber-based pressure-sensitive adhesive composition was prepared in the same manner as in Example 1, except that in place of 300 g of the natural rubber (weight-average molecular weight, 200,000), use was made of the same amount of a polyisobutylene rubber having a weight-average molecular weight of 50,000 ("Tetrax 5T" manufactured by Nippon Petrochemicals Co., Ltd.). This composition was used to produce a pressure-sensitive adhesive tape in the same manner as in Example 1.

The pressure-sensitive adhesive tapes respectively obtained in Examples 1 and 2 and Comparative Examples 1 to 5 were subjected to an adhesive strength test and a holding power test by the following methods. The results of these tests are shown in Tables 1 to 3.

<Adhesive Strength Test>

A stainless-steel plate frequently employed in adhesive strength measurements and an OSB (oriented strand board), which is a representative rough-surface plywood for use in the field of building/civil engineering, were used as adherends. A pressure-sensitive adhesive tape having a width of 25 mm was applied under a load of 2 kg and peeled off at a peel angle of 180° and a peel rate of 300 mm/min at a temperature of each of −10° C., 0° C., 23° C., and 60° C. The adhesive strength in the peeling (N/25 mm width) was measured.

<Holding Power Test>

A pressure-sensitive adhesive tape having a size of 25 mm×25 mm was applied to a stainless-steel plate. In a 60° C. atmosphere, a static load of 300 g was perpendicularly suspended from one end of the pressure-sensitive adhesive tape, and the distance (mm) over which the pressure-sensitive adhesive tape shifted in five minutes was measured.

TABLE 1

|  | Adhesive strength test [to stainless-steel plate] (N/25 mm width) | | | |
| --- | --- | --- | --- | --- |
|  | −10° C. | 0° C. | 23° C. | 60° C. |
| Example 1 | 15.0 | 19.0 | 23.0 | 6.0 |
| Example 2 | 17.0 | 19.5 | 24.0 | 6.0 |
| Comparative Example 1 | 18.0 | 20.0 | 25.0 | 6.0 |
| Comparative Example 2 | 19.5 | 23.0 | 30.0 | 7.0 |
| Comparative Example 3 | 17.0 | 21.0 | 26.0 | 3.5 |
| Comparative Example 4 | 18.5 | 17.5 | 17.0 | 4.0 |
| Comparative Example 5 | 19.0 | 18.0 | 17.0 | 4.5 |

TABLE 2

|  | Adhesive strength test [to OSB] (N/25 mm width) | | | |
| --- | --- | --- | --- | --- |
|  | −10° C. | 0° C. | 23° C. | 60° C. |
| Example 1 | 8.5 | 17.0 | 18.0 | 4.5 |
| Example 2 | 6.0 | 10.0 | 14.0 | 4.5 |
| Comparative Example 1 | 2.5 | 8.0 | 15.0 | 5.0 |
| Comparative Example 2 | 3.0 | 5.0 | 10.0 | 11.0 |
| Comparative Example 3 | 6.0 | 10.0 | 18.0 | 3.0 |
| Comparative Example 4 | 2.5 | 7.0 | 6.0 | 3.0 |
| Comparative Example 5 | 4.0 | 20.0 | 17.0 | 5.0 |

TABLE 3

|  | Holding power test [shifting distance in 5 min: 60° C.] (mm) |
| --- | --- |
| Example 1 | 3.0 |
| Example 2 | 1.5 |
| Comparative Example 1 | 1.3 |
| Comparative Example 2 | 0.5 |
| Comparative Example 3 | 10.0 |
| Comparative Example 4 | falling in 2 min |
| Comparative Example 5 | 5.8 |

The results given in Tables 1 to 3 show the following. There is not a large difference between the pressure-sensitive adhesive tapes of Examples 1 and 2 and those of Comparative Examples 1 to 5 in adhesive strength in application to the stainless-steel plate. However, with respect to adhesive strength in application to the OSB, which has rough surfaces, the pressure-sensitive adhesive tapes of Examples 1 and 2 according to the invention are superior to the pressure-sensitive adhesive tapes of Comparative Examples 1 to 5 in the adhesive strength over the range of from the low temperatures to the high temperature. The adhesive tapes of Examples 1 and 2 are superior also in holding power. It can be seen that these adhesive tapes have a well balanced combination of performances.

In contrast, the pressure-sensitive adhesive tape of Comparative Example 1, which was produced without using natural rubber having a weight-average molecular weight of from 100,000 to 400,000, shows considerably poor OSB adhesive strength at low temperatures (−10° C. and 0° C.). The pressure-sensitive adhesive tape of Comparative Example 2, which employs natural rubber having a higher molecular weight, remains almost unimproved in OSB adhesive strength at the low temperatures (−10° C. and 0° C.).

Furthermore, the pressure-sensitive adhesive tape of Comparative Example 3, in which natural rubber having a weight-average molecular weight of from 100,000 to 400,000 has been incorporated in too large an amount, shows a low adhesive strength at a high temperature (60° C.) and impaired holding power.

The pressure-sensitive adhesive tape of Comparative Example 4, which employs low-molecular polyisoprene in place of the natural rubber, fails to have improved OSB adhesive strength and further has poor holding power.

Moreover, the pressure-sensitive adhesive tape of Comparative Example 5, which employs low-molecular polyisobutylene, is insufficient in the improvement of −10° C. OSB adhesive strength and hence difficult to use in the winter season at subzero temperatures, although it has a greatly improved OSB adhesive strength at 0° C.

Next, the pressure-sensitive adhesive tapes respectively obtained in Examples 1 and 2 and Comparative Examples 1 to 5 were subjected to a durability test by the following method. The results of this test are shown in Tables 4 and 5.

<Durability Test>

The durability of a pressure-sensitive adhesive tape was examined by allowing the adhesive tape to stand in a 90° C. oven for 100 days for aging acceleration and then subjected to the same adhesive strength test and holding power test as shown above. The found values were compared with the initial values. The adhesive strength test was conducted at 23° C.

TABLE 4

|  | Adhesive strength at 23° C. [to stainless-steel plate] (N/25 mm width) | | Adhesive strength at 23° C. [to OSB] (N/25 mm width) | |
| --- | --- | --- | --- | --- |
|  | Initial | After 100 days at 90° C. | Initial | After 100 days at 90° C. |
| Example 1 | 23.0 | 18.5 | 15.5 | 10.5 |
| Example 2 | 24.0 | 19.5 | 14.0 | 10.5 |
| Comparative Example 1 | 25.0 | 27.5 | 15.0 | 11.0 |
| Comparative Example 2 | 30.0 | 17.5 | 10.0 | 6.5 |
| Comparative Example 3 | 26.0 | 22.0 | 18.0 | 10.0 |
| Comparative Example 4 | 17.0 | 18.0 | 6.0 | 5.0 |
| Comparative Example 5 | 17.0 | 17.5 | 17.0 | 10.5 |

TABLE 5

|  | Holding power[shifting distance in 5 min: 60° C.] (mm) | |
| --- | --- | --- |
|  | Initial | After 100 days at 90° C. |
| Example 1 | 3.0 | 1.5 |
| Example 2 | 1.5 | 1.7 |
| Comparative Example 1 | 1.3 | 2.1 |
| Comparative Example 2 | 0.5 | falling in 2 min |
| Comparative Example 3 | 10.0 | 8.0 |
| Comparative Example 4 | falling in 2 min | falling in 1 min |
| Comparative Example 5 | 5.8 | falling in 4 min |

The results given in Tables 4 and 5 show the following. The pressure-sensitive adhesive tapes of Examples 1 and 2 have undergone almost no change in holding power through the durability test although they have undergone a slight decrease in adhesive strength. In contrast, among the pressure-sensitive adhesive tapes of Comparative Examples 1 to 5, the pressure-sensitive adhesive tapes of Comparative Examples 2, 4, and 5 have undergone a considerable decrease in holding power, although the pressure-sensitive adhesive tapes of Comparative Examples 1 and 3 show almost the same properties as the adhesive tapes of Examples 1 and 2. This indicates that use of natural rubber having a high molecular weight (Comparative Example 2) or a synthetic rubber having a low molecular weight (Comparative Examples 4 and 5) is ineffective in reconciling initial performances with durability.

As described above, the invention can provide a rubber-based pressure-sensitive adhesive composition which, due to the constitution comprising a main ingredient comprising a rubbery polymer and natural rubber having a weight-average molecular weight of from 100,000 to 400,000 incorporated therein, is excellent in both low-temperature adhesive strength in application to rough surfaces and high-temperature holding power, is free from adhesive layer separation in low-temperature application, and is excellent also in high-temperature cohesive force. The invention can further provide a pressure-sensitive adhesive sheet employing the composition. The pressure-sensitive adhesive sheet and the composition further have excellent durability and are usable in applications where durability is required.

Furthermore, this rubber-based pressure-sensitive adhesive composition softens upon heating and can be easily molded. It can be applied without using an organic solvent or water, and an adhesive layer having any desired thickness can be formed. The nonuse of an organic solvent or water eliminates the necessity of a drying step after application. The adhesive composition hence contributes to energy saving and is desirable from the standpoint of the global environment. Furthermore, the pressure-sensitive adhesive tape enables the step of caulking for waterproofing buildings to be replaced by taping. This is highly desirable because waterproofing by taping attains improved durability and leads to reductions in application time and cost.

While the invention has been described in detail and with reference to specific embodiments thereof, it will be apparent to one skilled in the art that various changes and modifications can be made therein without departing from the scope thereof.

This application is based on Japanese patent applications No. 2003-174255 filed on Jun. 19, 2003, the entire contents thereof being hereby incorporated by reference.

What is claimed is:

1. A rubber-based pressure-sensitive adhesive composition comprising:
   a butyl rubber or a reclaimed butyl rubber,
   a natural rubber having a weight-average molecular weight of from 100,000 to 400,000, and
   a filler,
   wherein the amount of the natural rubber is 5 parts by weight or more and less than 100 parts by weight, based on 100 parts by weight of the butyl rubber or reclaimed butyl rubber,
   wherein the amount of the filler is from 50 to 300 parts by weight based on 100 parts by weight of the butyl rubber or reclaimed butyl rubber, and
   wherein the rubber-based pressure-sensitive adhesive composition is solid.

2. The rubber-based pressure-sensitive adhesive composition according to claim 1, wherein the amount of the natural rubber is from 5 to 50 parts by weight based on 100 parts by weight of the butyl rubber or reclaimed butyl rubber.

3. The rubber-based pressure-sensitive adhesive composition according to claim 1, which further comprises a tackifier in an amount of from 10 to 200 parts by weight based on 100 parts by weight of the butyl rubber or reclaimed butyl rubber.

4. The rubber-based pressure-sensitive adhesive composition according to claim 1, which further comprises a softener in an amount of 200 parts by weight or smaller based on 100 parts by weight of the butyl rubber or reclaimed butyl rubber.

5. The rubber-based pressure-sensitive adhesive composition according to claim 1, which further comprises a crosslinking agent in an amount of from 0.1 to 20 parts by weight based on 100 parts by weight of the butyl rubber or reclaimed butyl rubber.

6. A pressure-sensitive adhesive sheet which comprises a substrate having provided thereon a layer comprising the rubber-based pressure-sensitive adhesive composition according to any one of claims 1, 2, or 3 to 5.

7. The rubber-based pressure-sensitive adhesive composition according to claim 5, wherein the crosslinking agent is at least one kind selected from a thiuram vulcanizing agent, a quinoid vulcanizing agent, a quinonedioxime vulcanizing agent and a maleimide vulcanizing agent.

8. The rubber-based pressure-sensitive adhesive composition according to claim 1, wherein the amount of the natural rubber is 5 to 50 parts by weight based on 100 parts by weight of the butyl rubber or the reclaimed butyl rubber.

9. The rubber-based pressure-sensitive adhesive composition according to claim 1, wherein the rubber-based pressure-sensitive adhesive composition comprises no organic solvent or water.

* * * * *